(12) United States Patent
Jia et al.

(10) Patent No.: US 11,299,046 B2
(45) Date of Patent: Apr. 12, 2022

(54) METHOD, DEVICE, AND COMPUTER PROGRAM PRODUCT FOR MANAGING APPLICATION ENVIRONMENT

(71) Applicant: EMC IP Holding Company LLC, Hopkinton, MA (US)

(72) Inventors: Zhen Jia, Shanghai (CN); Pedro Fernandez Orellana, Shanghai (CN); Danqing Sha, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 57 days.

(21) Appl. No.: 16/882,870

(22) Filed: May 26, 2020

(65) Prior Publication Data

US 2021/0339629 A1 Nov. 4, 2021

(30) Foreign Application Priority Data

Apr. 30, 2020 (CN) .......................... 202010361548.4

(51) Int. Cl.
*B60K 37/02* (2006.01)
*G01D 21/02* (2006.01)

(52) U.S. Cl.
CPC ............. *B60K 37/02* (2013.01); *G01D 21/02* (2013.01); *B60K 2370/166* (2019.05); *B60K 2370/167* (2019.05)

(58) Field of Classification Search
CPC .............. B60K 37/02; B60K 2370/167; B60K 2370/166; G01D 21/02
See application file for complete search history.

(56) References Cited

U.S. PATENT DOCUMENTS

| | | |
|---|---|---|
| 5,956,665 A | 9/1999 | Martinez et al. |
| 6,384,842 B1 | 5/2002 | DeKoning et al. |
| 7,322,010 B1 | 1/2008 | Mikula |
| 7,447,807 B1 | 11/2008 | Merry et al. |
| 9,959,190 B2 | 5/2018 | Klein et al. |

(Continued)

OTHER PUBLICATIONS

Intel, "Monitoring Media Wearout Levels of Intel Solid-State Drives," Technology Brief, 2011, 2 pages.

(Continued)

*Primary Examiner* — Chico A Foxx
(74) *Attorney, Agent, or Firm* — Ryan, Mason & Lewis, LLP

(57) ABSTRACT

In a method, a set of attribute information is received from a set of sensors in the application environment, respectively. Based on the set of attribute information, a state of the application environment is obtained. Based on a knowledge base associated with the application environment, reference information corresponding to the state of the application environment is determined, and the reference information represents candidate information that a user in the application environment needs in the state. The reference information is provided to the user. Further provided are a corresponding device and a corresponding computer program product. With exemplary embodiments of the present disclosure, the manual labor loads in the application environment can be reduced for the user, and information required in the current state can be provided to the user, thus reducing mis-operations of the user caused by mistakes in human discretion.

20 Claims, 9 Drawing Sheets

(56) References Cited

U.S. PATENT DOCUMENTS

| | | |
|---|---|---|
| 10,409,523 B1 | 9/2019 | Kim et al. |
| 10,410,424 B1 | 9/2019 | Khokhar et al. |
| 11,023,730 B1* | 6/2021 | Zhou .................... G06K 9/3233 |
| 11,201,971 B1* | 12/2021 | Tanaka ............... H04N 1/00029 |
| 2005/0090911 A1 | 4/2005 | Ingargiola et al. |
| 2006/0095662 A1 | 5/2006 | Arnott |
| 2008/0040522 A1 | 2/2008 | Matthews |
| 2009/0003353 A1 | 1/2009 | Ding et al. |
| 2009/0249213 A1 | 10/2009 | Murase et al. |
| 2010/0168998 A1* | 7/2010 | Matsunaga ........... B60W 30/10 |
| | | 701/532 |
| 2010/0191908 A1 | 7/2010 | Yamakawa |
| 2010/0317420 A1 | 12/2010 | Hoffberg |
| 2011/0115816 A1 | 5/2011 | Brackney |
| 2011/0310120 A1 | 12/2011 | Narayanan |
| 2012/0090004 A1 | 4/2012 | Jeong |
| 2012/0092707 A1* | 4/2012 | Saito ..................... G06F 3/1253 |
| | | 358/1.15 |
| 2012/0243020 A1* | 9/2012 | Saito ......................... B41J 3/46 |
| | | 358/1.13 |
| 2012/0311260 A1 | 12/2012 | Yamagiwa et al. |
| 2013/0031202 A1 | 1/2013 | Mick et al. |
| 2013/0114100 A1 | 5/2013 | Torii et al. |
| 2013/0120450 A1* | 5/2013 | Kim .......................... G09G 5/00 |
| | | 345/633 |
| 2013/0145065 A1* | 6/2013 | Ricci .................. G06F 3/04847 |
| | | 710/241 |
| 2013/0145360 A1* | 6/2013 | Ricci ................. G06K 9/00362 |
| | | 717/174 |
| 2013/0157607 A1* | 6/2013 | Paek ...................... B60K 35/00 |
| | | 455/404.1 |
| 2014/0025414 A1 | 1/2014 | Worden et al. |
| 2014/0173474 A1 | 6/2014 | Klemenz et al. |
| 2014/0210978 A1* | 7/2014 | Gunaratne ......... G06K 9/00845 |
| | | 348/77 |
| 2014/0375447 A1* | 12/2014 | Raghunathan .......... H04L 67/10 |
| | | 340/462 |
| 2016/0139600 A1* | 5/2016 | Delp ........................ B60D 1/04 |
| | | 701/26 |
| 2016/0140868 A1* | 5/2016 | Lovett ................... G06T 19/006 |
| | | 434/118 |
| 2016/0196584 A1 | 7/2016 | Franklin et al. |
| 2016/0214621 A1* | 7/2016 | Baalu ..................... B60K 37/02 |
| 2016/0250925 A1* | 9/2016 | Takimoto ............... B60K 37/02 |
| | | 345/207 |
| 2016/0353880 A1* | 12/2016 | Sigal ...................... G06Q 10/00 |
| 2017/0012996 A1 | 1/2017 | Hu et al. |
| 2017/0017617 A1 | 1/2017 | Sato et al. |
| 2017/0072850 A1* | 3/2017 | Curtis .................... G08G 1/168 |
| 2017/0091607 A1* | 3/2017 | Emeis ................... G06T 19/006 |
| 2017/0109916 A1* | 4/2017 | Kurz ....................... G06T 11/60 |
| 2017/0190083 A1* | 7/2017 | Zhou ...................... B29C 45/14 |
| 2017/0228161 A1 | 8/2017 | Nangoh |
| 2017/0232975 A1* | 8/2017 | Burk ...................... B60W 50/16 |
| | | 701/48 |
| 2017/0285943 A1 | 10/2017 | Dalmatov |
| 2017/0285972 A1 | 10/2017 | Dalmatov |
| 2017/0288945 A1 | 10/2017 | Chandangoudar |
| 2017/0322717 A1* | 11/2017 | Cheng .................... B60K 35/00 |
| 2017/0364148 A1* | 12/2017 | Kim ........................ G06F 3/1454 |
| 2018/0004204 A1* | 1/2018 | Rider .................... B60W 50/10 |
| 2018/0007138 A1* | 1/2018 | Nakamura ............ A61B 5/1118 |
| 2018/0018822 A1 | 1/2018 | Zagrebin et al. |
| 2018/0035606 A1 | 2/2018 | Burdoucci |
| 2018/0068502 A1* | 3/2018 | Oesterle ................. H04N 7/185 |
| 2018/0158209 A1 | 6/2018 | Fine et al. |
| 2018/0239991 A1 | 8/2018 | Weller et al. |
| 2018/0373350 A1* | 12/2018 | Rao ........................ B60K 35/00 |
| 2019/0155382 A1* | 5/2019 | Ikuta ......................... H04N 5/64 |
| 2019/0213976 A1* | 7/2019 | Rakshit .................. B60K 37/02 |
| 2019/0278992 A1* | 9/2019 | Hossain ................. G06Q 10/20 |
| 2019/0316912 A1* | 10/2019 | Maggiore ............ G01C 21/206 |
| 2019/0378475 A1* | 12/2019 | Lim ........................ B60R 16/02 |
| 2020/0143333 A1* | 5/2020 | Gonzalez, Jr. ......... G06Q 10/20 |
| 2020/0148166 A1* | 5/2020 | Wunsche, III ..... B60H 1/00428 |
| 2020/0151475 A1* | 5/2020 | Wunsche, III ....... G06K 9/6201 |
| 2020/0191951 A1* | 6/2020 | Reilly ..................... G01S 17/04 |
| 2020/0258480 A1* | 8/2020 | Bronder .................... G09G 5/38 |
| 2020/0331486 A1* | 10/2020 | Wieczorek ......... G06K 9/00845 |
| 2020/0389564 A1* | 12/2020 | Kodimer ............ H04N 1/00408 |
| 2020/0389600 A1* | 12/2020 | Capurso .......... H04N 5/232933 |
| 2021/0063214 A1* | 3/2021 | Li ........................ G08B 21/0492 |
| 2021/0132686 A1* | 5/2021 | Awaji ................. G02B 27/0093 |
| 2021/0156705 A1* | 5/2021 | Pietryka ............. G01C 21/3658 |

OTHER PUBLICATIONS

Y. Park et al., "Self-Controllable Secure Location Sharing for Trajectory-Based Message Delivery on Cloud-Assisted VANETs," Sensors (Basel), Jul. 1, 2018, 23 pages.

Nintendo, "Pokemon Go," https://www.pokemon.com/us/pokemon-video-games/pokemon-go/, 2019, 12 pages.

U.S. Appl. No. 16/261,941 filed in the name of Brian C. Mullins et al. on Jan. 30, 2019, and entitled "Location Assurance Using Location Indicators Modified by Shared Secrets."

* cited by examiner

METHOD, DEVICE, AND COMPUTER PROGRAM PRODUCT FOR MANAGING APPLICATION ENVIRONMENT

RELATED APPLICATION(S)

The present application claims priority to Chinese Patent Application No. 202010361548.4, filed Apr. 30, 2020, and entitled "Method, Device, and Computer Program Product for Managing Application Environment," which is incorporated by reference herein in its entirety.

FIELD

Embodiments of the present disclosure relate to management of application environments, and more particularly, to a method, a device, and a computer program product for managing an application environment based on data collected by a sensor.

BACKGROUND

With the development of computer technologies, many types of application environments have emerged. In order to ensure the stable operation of an application environment, an administrator and/or user of the application environment needs to track the state of the application environment and adjust the application environment based on human discretion. However, these solutions are not satisfactory in terms of execution efficiency. At this point, how to manage the application environment and ensure its normal operation has become a research hotspot.

SUMMARY

Therefore, it is expected to be able to develop and implement a technical solution for managing an application environment in a more effective manner. The technical solution is expected to be compatible with the existing management system of the application environment, and to implement and manage the application environment in a more effective manner by modifying various configurations of the existing management system.

According to a first aspect of the present disclosure, a method for managing an application environment is provided. In the method, a set of attribute information is received from a set of sensors in the application environment, respectively. Based on the set of attribute information, a state of the application environment is obtained. Based on a knowledge base associated with the application environment, reference information corresponding to the state of the application environment is determined, and the reference information represents candidate information that a user in the application environment needs in the state. The reference information is provided to the user.

According to a second aspect of the present disclosure, provided is an electronic device, including: at least one processor; and a memory coupled to the at least one processor, wherein the memory has instructions stored therein, and the instructions, when executed by the at least one processor, cause the device to perform an action for managing an application environment. The action includes: receiving a set of attribute information from a set of sensors in the application environment respectively; obtaining a state of the application environment based on the set of attribute information; determining reference information corresponding to the state of the application environment based on a knowledge base associated with the application environment, wherein the reference information represents candidate information that a user in the application environment needs in the state; and providing the reference information to the user.

According to a third aspect of the present disclosure, provided is a computer program product, tangibly stored on a non-transitory computer readable medium and including machine-executable instructions for executing the method according to the first aspect of the present disclosure.

BRIEF DESCRIPTION OF THE DRAWINGS

The features, advantages, and other aspects of the embodiments of the present disclosure will become more apparent in conjunction with the drawings and with reference to the following detailed description. Here, several embodiments of the present disclosure are shown in an exemplary and non-limiting manner. In the drawings.

DETAILED DESCRIPTION

Figure 1:
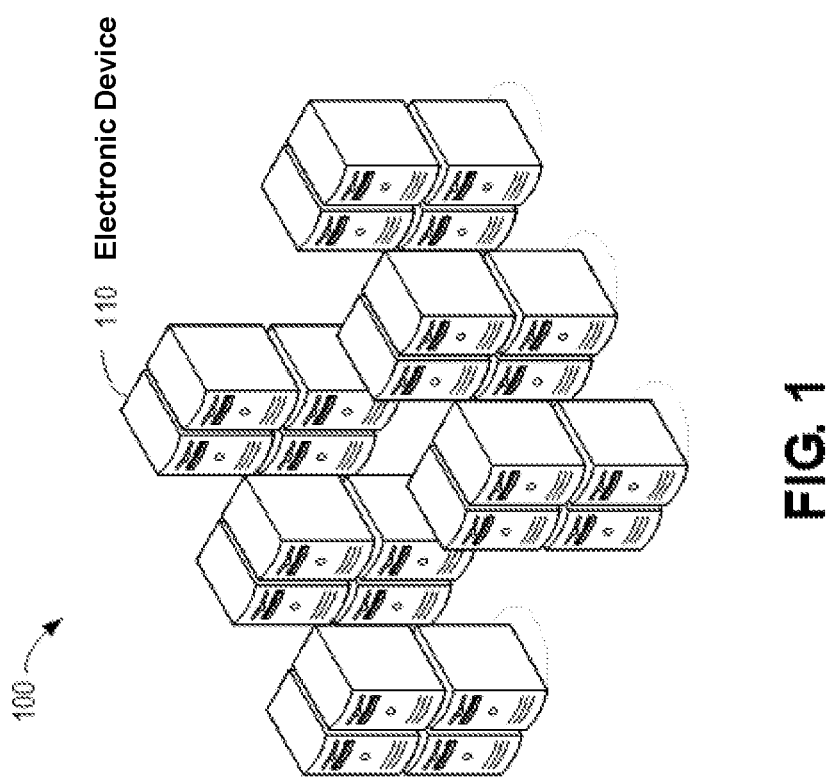
FIG. 1 schematically shows a block diagram of an application environment in which a method according to an exemplary embodiment of the present disclosure can be used.

Illustrative embodiments of the present disclosure will now be described in more detail below with reference to the accompanying drawings. Although illustrative embodiments of the present disclosure are shown in the drawings, it should be understood that the present disclosure can be implemented in various forms and should not be limited by the embodiments set forth herein. Instead, these embodiments are provided in order to make the present disclosure more thorough and complete, and to fully convey the scope of the present disclosure to those skilled in the art.

As used herein, the term "including" and variations thereof mean open-ended inclusion, that is, "including but not limited to." Unless specifically stated otherwise, the term "or" means "and/or." The term "based on" means "at least in part on." The terms "one exemplary embodiment" and "one embodiment" mean "at least one exemplary embodiment." The term "another embodiment" means "at least one further embodiment." The terms "first," "second," and the like may refer to the same or different objects. Below may also include other explicit and implicit definitions.

It will be appreciated that the application environment can include a variety of environments. Assuming that a user is an administrator of a data center, the application environment may include a user's working environment, that is, the data center. The application environment can also include the user's living environment, such as the user's vehicle environment, the user's residence environment, the user's shopping environment, the user's dining environment, and so on. For convenience of description, a specific embodiment of the present disclosure will be described below only using a data center as an example of an application environment.

First, referring to FIG. 1, an application environment of an exemplary embodiment of the present disclosure will be described. FIG. 1 schematically shows block diagram 100 of an application environment in which a method according to an exemplary embodiment of the present disclosure can be used. The application environment may include a large number of electronic devices 110, as shown in FIG. 1. Further, the application environment may also involve environmental parameters, for example, temperature, humidity, air quality, etc. Now, various electronic devices and various environmental parameters can be controlled independently. However, at present, an administrator in the data center has to shuttle between multiple devices such as the electronic devices, a temperature control device, a humidity control device, and an air quality control device. At present, how to manage a large number of electronic devices in the application environment and control the various environmental parameters become a research hotspot.

Figure 2:
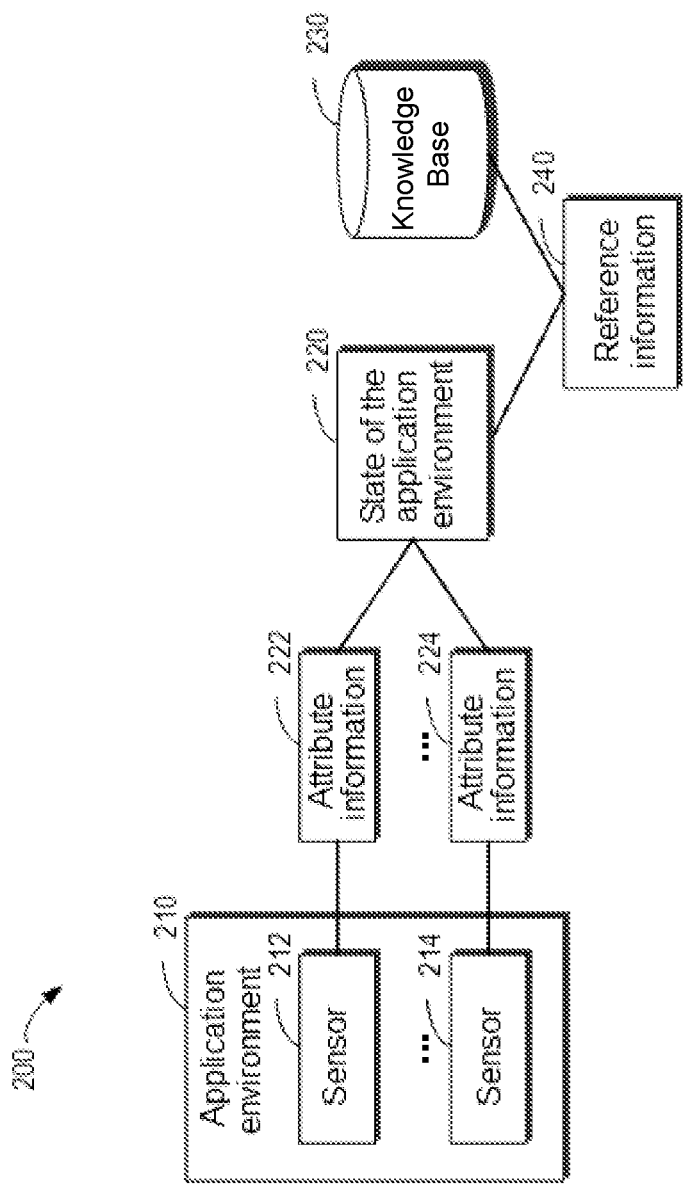
FIG. 2 schematically shows a block diagram of a process for managing an application environment according to an exemplary embodiment of the present disclosure.

It is desirable to provide a more effective technical solution for managing an application environment. In order to solve the defects in the above technical solution, the exemplary embodiment of the present disclosure provides a technical solution for managing an application environment. In this technical solution, a plurality of sensors may be used to collect information in various aspects of the application environment in order to determine a state of the application environment. First, an outline of an exemplary embodiment of the present disclosure will be described with reference to FIG. 2. FIG. 2 schematically shows block diagram 200 of a process for managing an application environment according to an exemplary embodiment of the present disclosure.

As shown in FIG. 2, a plurality of sensors 212, . . . , and 214 may be deployed in application environment 210 to collect a set of attribute information 222, . . . , and 224 of the application environment, respectively. Then, state 220 of the application environment may be determined based on a set of attribute information 222, . . . , and 224. Further, reference information 240 for managing application environment 210 may be determined and presented based on state 220 of the application environment and knowledge base 230 storing knowledge associated with application environment 210.

With the exemplary embodiment of the present disclosure, a user does not have to check each piece of attribute information in application environment 210 one by one. On the one hand, various attribute information of application environment 210 can be automatically collected; on the other hand, relevant reference information 240 for managing application environment 210 can be more accurately determined based on the knowledge base 230. In this way, manual labor loads can be reduced for the user, and faults of application environment 210 caused by a mistake in human discretion can also be reduced.

Figure 3:
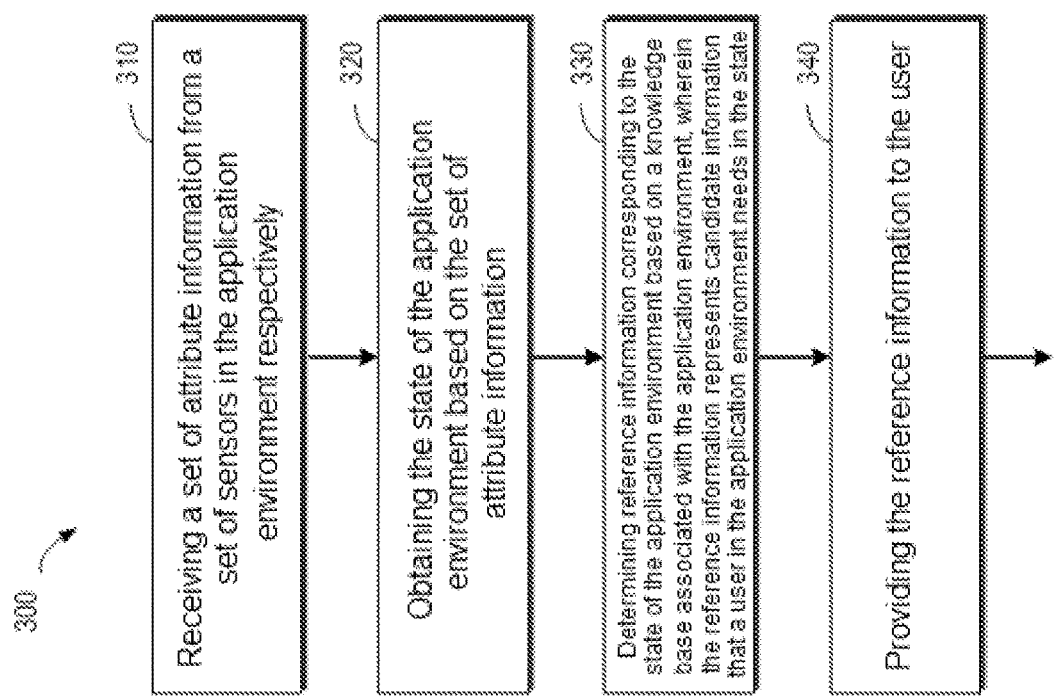
FIG. 3 schematically shows a flowchart of a method for managing an application environment according to an exemplary embodiment of the present disclosure.

More details regarding an exemplary embodiment of the present disclosure will be described hereinafter with reference to FIG. 3. FIG. 3 schematically shows a flowchart of method 300 for managing application environment 210 according to an exemplary embodiment of the present disclosure. As shown in FIG. 3, at block 310, a set of attribute information is received from a set of sensors in application environment 210, respectively. According to an exemplary embodiment of the present disclosure, attribute information may be collected via multiple types of sensors.

Specifically, the sensors may include at least any one of: an image sensor, a video sensor, an audio sensor, a temperature sensor, a humidity sensor, a pressure sensor, an air quality sensor, a smoke sensor, a speed sensor, an acceleration sensor, a vibration sensor, a light sensor, a position sensor, etc. With the exemplary embodiment of the present disclosure, attribute information may be collected from different sensors based on the type of application environment 210.

For example, in a data center environment, a set of attribute information may be received from image sensors, temperature sensors, humidity sensors, and air quality sensors deployed in the data center, and from image sensors and sound sensors in a mobile device of the administrator of the data center. For another example, in a vehicle environment, a set of attribute information may be received from speed sensors, acceleration sensors, vibration sensors, etc. deployed in the vehicle. In this way, various types of attribute information that are expected to be monitored may be obtained, thereby facilitating comprehensive and effective management of the application environment.

According to an exemplary embodiment of the present disclosure, the attribute information may further include the user's location, and application environment 210 to be managed may be determined based on the change in the user's location. Specifically, a set of attribute information may be received according to a determination that the user enters application environment 210. For example, when the user is located in a work environment of the data center, it can be considered that the user is working and a state of the data center should be provided to the user at this time. When the user has left work and is going to drive home, vehicle-related sensors may be activated based on a determination that the user enters a vehicle environment.

It will be understood that in different application environments, the attribute information expected to be monitored may be different. With the exemplary embodiment of the present disclosure, the application environment around the user may be determined based on factors such as the user's location and/or time, which can more accurately determine which sensors are expected to be activated to collect attribute information.

Figure 4:
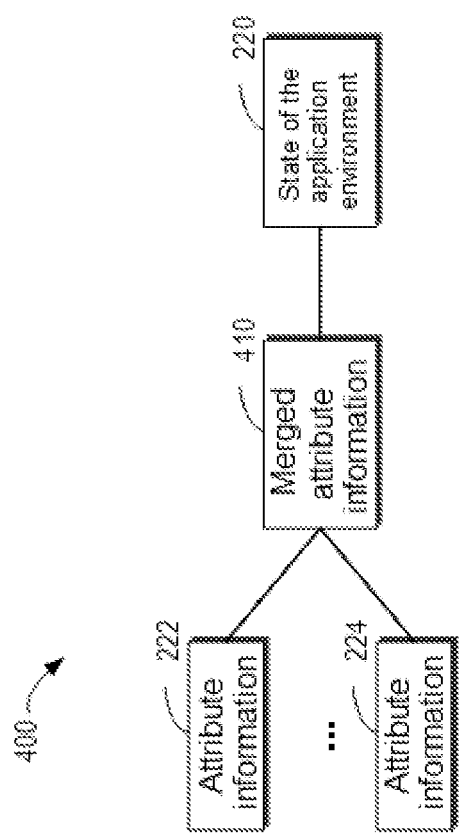
FIG. 4 schematically shows a block diagram of a process for managing an application environment according to an exemplary embodiment of the present disclosure.

At block 320, based on a set of attribute information, state 220 of the application environment is obtained. According to an exemplary embodiment of the present disclosure, the received set of attribute information may be merged to determine state 220 of the application environment. FIG. 4 schematically shows block diagram 400 of a process for managing application environment 210 according to an exemplary embodiment of the present disclosure. For example, attribute information from each sensor may be stored based on a vector. In one example, all the attribute information received may be organized in a serial manner. Assuming that n pieces of attribute information are received, state 220 of the application environment may be represented by an n-dimensional vector. For example, all the attribute information may be organized in the order of images of the overall environment of application environment 210, temperature, humidity, and images of various application objects in the application environment. In this case, each dimension in the vector represents one piece of attribute information.

It will be understood that the collected attribute information may involve a large amount of data, and in this case, the collected data may be processed based on, for example, artificial intelligence technologies. For example, the above n-dimensional vector may be mapped to the merged attribute information 410 based on a machine learning method. For another example, pre-processing may be performed on the collected set of attribute information to find fault information related to potential faults, so that reference information related to the fault information can be provided in the future. According to an exemplary embodiment of the present disclosure, the received attribute information may be filtered in order to determine attribute information that may cause a fault in application environment 210. According to the exemplary embodiment of the present disclosure, the collected higher-dimensional attribute information may be mapped to lower-dimensional data based on other technologies that have been provided and/or will be developed in the future to facilitate later processing and analysis.

Application environment 210 may include application objects, and the sensors may collect images about each application object. In this case, the set of attribute information may include the images of the application objects. It will be understood that during the operation of an application object, the basic state related to the object may be obtained from an external image of the application object. Furthermore, the state of the application object may be determined based on the image.

It will be understood that although communicating with various application objects and obtaining detailed internal state information may be more helpful in determining states of the application objects, the images obtained may be used to quickly obtain the basic states of the application objects without the need for complex communication interfaces. In this way, the complexity of managing application environment 210 can be simplified and the management performance can be improved.

According to an exemplary embodiment of the present disclosure, the application objects may include electronic devices in the data center. It will be understood that each electronic device generally has a control panel, and the control panel may provide various states of the electronic device. In the following description, an indicator light at the control panel will be used as a specific example to describe how to determine the reference information. One or more indicator lights at the control panel can display the operating state of the electronic device. Thus, the state of the electronic device may be determined based on a set of indicator lights of the electronic device in the image. In a simple example, it is assumed that the electronic device has only one indicator light, and the "on" and "off" of the indicator light indicate the power-on and power-off states of the electronic device, respectively. When the image of the electronic device displays the power-off state of the indicator light, generated reference information 240 may prompt the user that the electronic device is turned off. Further, the user may be prompted to check whether the power of the electronic device is disconnected, and so on.

Figure 5:
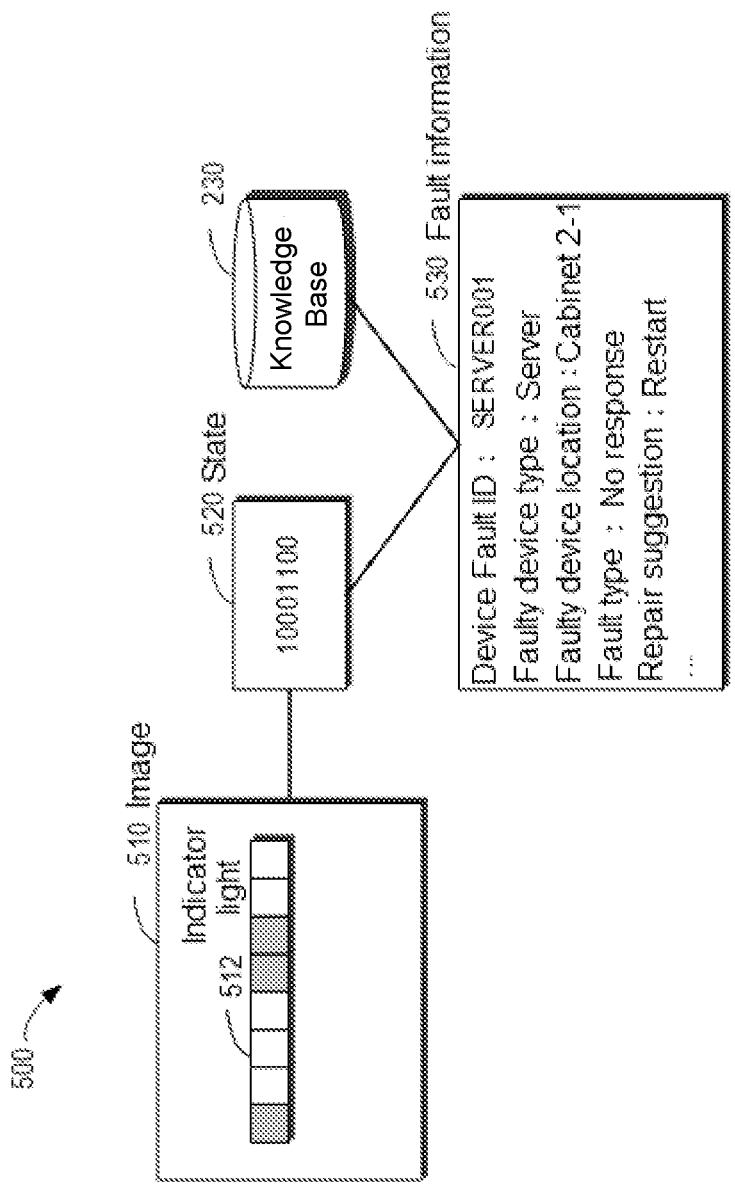
FIG. 5 schematically shows a block diagram of a process for determining reference information according to an exemplary embodiment of the present disclosure.

FIG. 5 schematically shows block diagram 500 of a process for determining reference information according to an exemplary embodiment of the present disclosure. Image 510 represents an image of a set of indicator lights 512 of the electronic device. Specifically, the boxes shown in dark color may indicate that the indicator lights are "on" and the blank boxes may indicate that the indicator lights are "off" By determining whether a set of indicator lights 512 are "on," state 520 (for example, represented by a binary number "10001100," where each bit represents the state of an indicator light) related to the electronic device may be determined. Further, state 520 may be input into knowledge base 230 in order to search for reference information corresponding to the state.

Related reference information matching state 520 may be found from knowledge base 230, for example, the reference information at this time may include fault information 530. Fault information 530 may include faulty device ID, faulty device type, faulty device location, fault type, repair suggestion, etc. It will be understood that the indicator lights of the application object may represent the basic state of the application object. By identifying the states of the indicator lights, the fault of the electronic device may be determined in a simple and effective manner. According to an exemplary embodiment of the present disclosure, the control panel may also include state information such as images, text, videos, and/or sound. In this case, the sensors may be used to collect the above information, and the state of the electronic device may be determined based on an image recognition technology and/or other technologies to further determine corresponding reference information.

According to an exemplary embodiment of the present disclosure, further communication with the control system of the electronic device may be performed in order to obtain more detailed information related to the electronic device. For example, the CPU operating state of the electronic device may be received. Assuming that the CPU resources are found to be exhausted by a certain program, then fault information 530 may further prompt to check the state of the program running in the electronic device. In this way, potential faults in the electronic device may be located more accurately.

How to determine state 220 of the application environment has been described above with reference to FIGS. 4 and 5. How to manage application environment 210 based on the determined state will be described below with reference to FIG. 3 again. At block 330, reference information 240 corresponding to state 220 of the application environment is determined based on knowledge base 230 associated with application environment 210. Here, reference information 240 represents candidate information that the user in application environment 210 may need in the current state.

According to an exemplary embodiment of the present disclosure, reference information 240 may include at least any one of: the location of the electronic device, navigation to the location of the electronic device, guidance to operate the electronic device, etc. With the exemplary embodiment of the present disclosure, the user may be provided with reference information about many aspects of faulty electronic device. In this way, it may be convenient for the user to determine the next action based on reference information 240.

According to the exemplary embodiment of the present disclosure, the sensors may be further used to collect the user's next action, and the knowledge base may be updated based on the user action. Assuming that the user does not go to the faulty device, but looks up the phone number of a technical expert in the contacts of his mobile terminal, knowledge about the contact information of the technical expert can be added to knowledge base 230. In this way, the knowledge in knowledge base 230 may be made more in line with user habits.

How to determine reference information 240 has been described above, and hereinafter, it will continue to describe how to provide reference information 240 to the user with reference to FIG. 3. At block 340, reference information 240 may be provided to the user via various presentation devices. It will be understood that reference information 240 herein may include many types of information, such as text information, image information, audio information, video information, and tactile information. Thus, according to the exemplary embodiment of the present disclosure, reference information 240 may be provided via various presentation devices. Specifically, the presentation device may include at least any one of: a mobile display device, a display device, a projection device, a wearable display device, an audio device, a haptic device, etc.

With the exemplary embodiment of the present disclosure, different presentation devices may be selected based on the type of application environment 210. For example, when the user is working with both hands and it is not convenient to carry a handheld display device, reference information 240 may be presented through a wearable display device such as glasses. An audio prompt for reference information 240 may also be provided to the user based on an audio device. For another example, when the user is in a noisy application environment, reference information 240 may be provided to the user based on vibration of a haptic device. With the exemplary embodiment of the present disclosure, a presentation device that is most suitable for application environment 210 may be selected to provide reference information 240 to guide the user's subsequent actions.

Figure 6A:
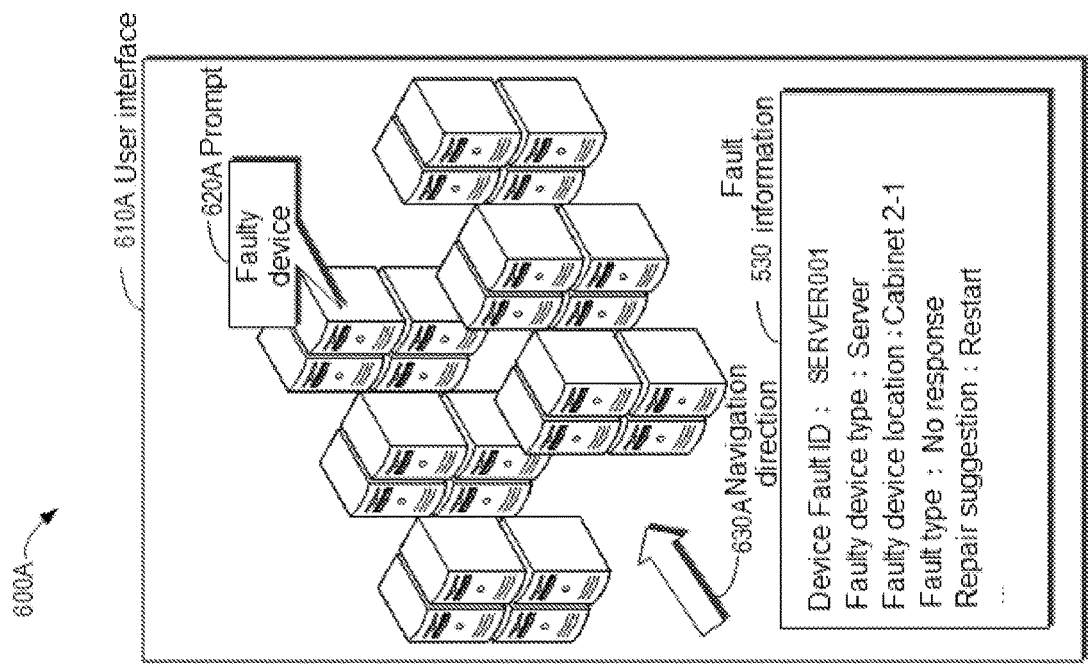
FIG. 6A schematically shows a block diagram of a user interface for displaying reference information according to an exemplary embodiment of the present disclosure.

According to an exemplary embodiment of the present disclosure, a set of attribute information may include an image of application environment 210, and reference information 240 may be superimposed on the image. FIG. 6A schematically shows block diagram 600A of user interface 610A for displaying reference information 240 according to an exemplary embodiment of the present disclosure. The image in FIG. 6A is an image from one sensor in application environment 210 (for example, an image sensor for monitoring the global state of the data center). Generated reference information 240 may be superimposed on the image. Reference information 240 may include: prompt 620A for indicating a faulty device; navigation direction 630A for indicating a direction to the faulty device; and fault information 530 for indicating related information of the faulty device.

With the exemplary embodiment of the present disclosure, in order to show in a clearer manner the reference information that needs attention from the user, reference information 240 may be superimposed on a real image based on augmented reality (AR) technology. In particular, for the reference information related to position and navigation, the superimposed reference information may correspond to the positions of the application object and the application environment in the real image. In this way, it can further facilitate the user in finding the application object that needs to be processed.

According to an exemplary embodiment of the present disclosure, reference information may be provided to users further based on virtual reality (VR) technology, augmented reality (AR) technology, and mixed reality (MR) technology. For example, mobile display devices, display devices, projection devices, wearable display devices, audio devices, and haptic devices may be used to present uses with various types of information, such as text information, image information, audio information, video information, and tactile information.

Figure 6B:
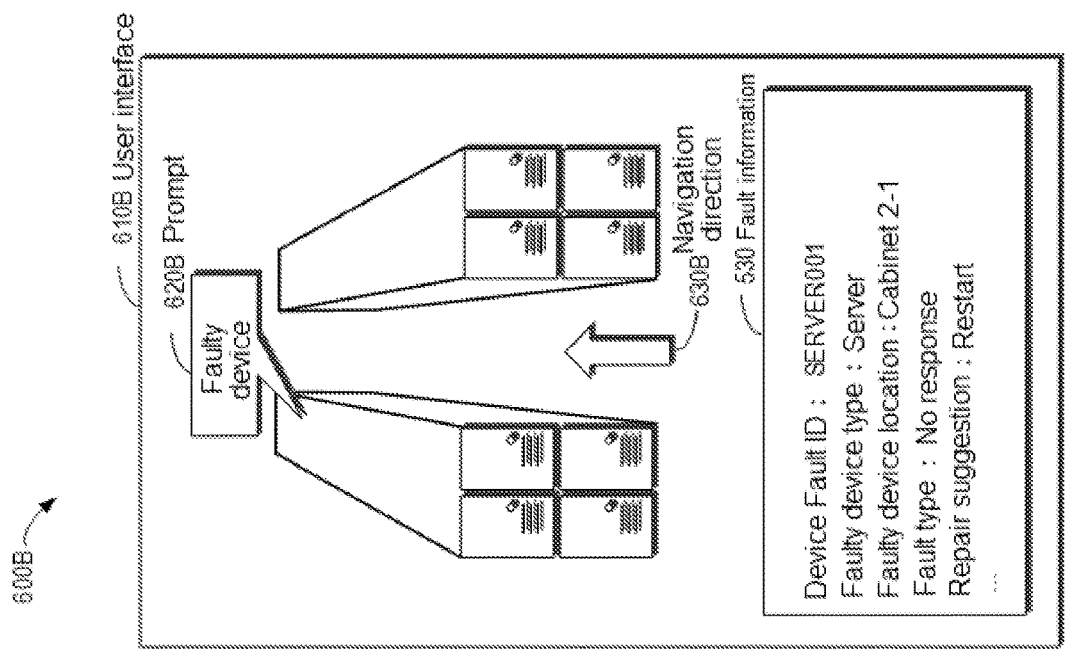
FIG. 6B schematically shows a block diagram of a user interface for displaying reference information according to an exemplary embodiment of the present disclosure.

According to an exemplary embodiment of the present disclosure, the camera of a mobile terminal held by a user may also serve as a sensor in application environment 210. In this case, reference information 240 may be superimposed on the image collected from the user's perspective. FIG. 6B schematically shows block diagram 600B of user interface 610B for displaying reference information 240 according to an exemplary embodiment of the present disclosure. As shown in FIG. 6B, the user is located at a passage between two rows of cabinets, and the image in user interface 610B is an image collected in real time from the mobile terminal in the hand of the user. When the user's orientation changes, the content in user interface 610B changes accordingly. The user may proceed in navigation direction 630B in order to reach the faulty device indicated by prompt 620B.

According to an exemplary embodiment of the present disclosure, the user can interact with reference information 240, and in this case, the state of application environment 210 will change. Attribute information of various aspects of the changed application environment may be further received to generate new reference information. If feedback of reference information 240 from the user is received, reference information 240 may be updated. Specifically, after checking reference information 240, the user may take corresponding actions. For example, the user may travel along navigation direction 630B shown in FIG. 6B and reach the vicinity of the faulty device. In this case, the reference information may be updated based on the current position of the user collected by the position sensor. Specifically, navigation direction 630B may be changed to prompt the user to turn left to reach the faulty device. In this way, the state of application environment 210 around the user may be determined in real time and reference information that most closely matches the current state of application environment 210 may be continuously generated.

According to an exemplary embodiment of the present disclosure, different reference information 240 may be set with respective priorities. Assuming that the user is on the way to the location of the faulty device and the smoke sensor finds that a fire may occur in the data center at this time, then the reference information about the fire may be provided to the user with priority. For example, a map of escape routes, operation manuals for fire door, and so on may be provided.

Details of providing reference information 240 in the environment of the data center have been described above with reference to FIGS. 6A and 6B. How to collect attribute information about a vehicle and provide related reference information 240 will be described below in a vehicle environment. According to an exemplary embodiment of the present disclosure, the application environment may include the vehicle environment, and the image of the application object may include an image of a dashboard of the vehicle. It will be understood that attribute information in various aspects of the vehicle is recorded in the dashboard of the vehicle. An image sensor may be deployed inside the vehicle to collect an image of the dashboard of the vehicle. In this way, attribute information of various aspects of the vehicle can be obtained in a simpler and more effective manner without having to interface and communicate with a control system of the vehicle. According to the exemplary embodiment of the present disclosure, other sensors may also be deployed inside the vehicle in order to collect more information on the state of the vehicle.

According to an exemplary embodiment of the present disclosure, the attribute information may be received from the control system of the vehicle. Here, the attribute information may further include at least any one of the speed, acceleration, steering, engine speed, airbag information, tire information, and collision information of the vehicle. With the exemplary embodiment of the present disclosure, various vehicle parameters in the control system of the vehicle may be fully utilized to determine the current state of the vehicle. In this way, the state of the application environment around the user may be determined more accurately, so as to retrieve more useful reference information 240 from knowledge base 230.

Figure 7:
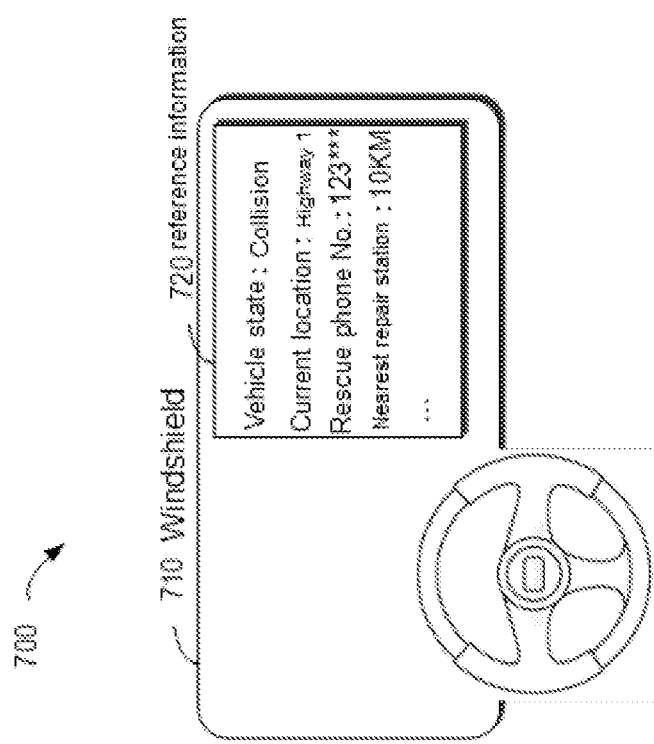
FIG. 7 schematically shows a block diagram for displaying reference information in a vehicle according to an exemplary embodiment of the present disclosure.

According to an exemplary embodiment of the present disclosure, reference information 240 may include at least any one of: safety guide, rescue information, and surrounding facility information. FIG. 7 schematically shows block diagram 700 for displaying reference information in a vehicle according to an exemplary embodiment of the present disclosure. Assuming that an airbag of the vehicle is detected to be deployed, it can be determined that the vehicle has collided. At this time, reference information 720 may be projected at windshield 710 of the vehicle. For example, the current location of the vehicle, rescue phone number, and related information of a repair station, etc. may be displayed.

It will be understood that when a vehicle fails, the user may not know what measures should be taken because of stress and other factors. With the exemplary embodiment of the present disclosure, the user may be provided with various types of candidate information regarding emergency handling of vehicle faults. In this way, the user may be assisted to make correct determinations quickly, and to quickly deal with vehicle faults while ensuring safety. Further, reference information 720 may help the user to remain calm in a panic and determine the next action based on reference information 720.

It will be understood that specific steps for managing application environment 210 are described above only using the data center and the vehicle as two specific examples of application environment 210. According to an exemplary embodiment of the present disclosure, application environment 210 may also include other environments. For example, application environment 210 may include the user's residence. When the user gets up in the morning, it can be determined that the user has got up based on sensors such as cameras in the residence. At this time, the user's mobile phone may display reference information 240 such as a prompt to broadcast news, weather forecast, and traffic information. For another example, the application environment may include any environment where the user is located. When the user is shopping in a department store, information about related products may be displayed to the user's mobile phone; when the user is in a museum, information about exhibits may be displayed to the user; and when the user is at a restaurant, information about food recommendations and coupons may be displayed to the user.

The examples of the method according to the present disclosure have been described in detail above with reference to FIGS. 2 to 7, and the implementation of corresponding devices will be described below. Specifically, an apparatus for managing an application environment is provided. The apparatus includes: a receiving module, configured to receive a set of attribute information from a set of sensors in the application environment respectively; an obtaining module, configured to obtain a state of the application environment based on the set of attribute information; a determining module, configured to determine reference information corresponding to the state of the application environment based on a knowledge base associated with the application environment, wherein the reference information represents candidate information that a user in the application environment needs in the state; and a providing module, configured to provide the reference information to the user. According to an exemplary embodiment of the present disclosure, the above-mentioned apparatus further includes modules for performing other steps in method 300.

Figure 8:
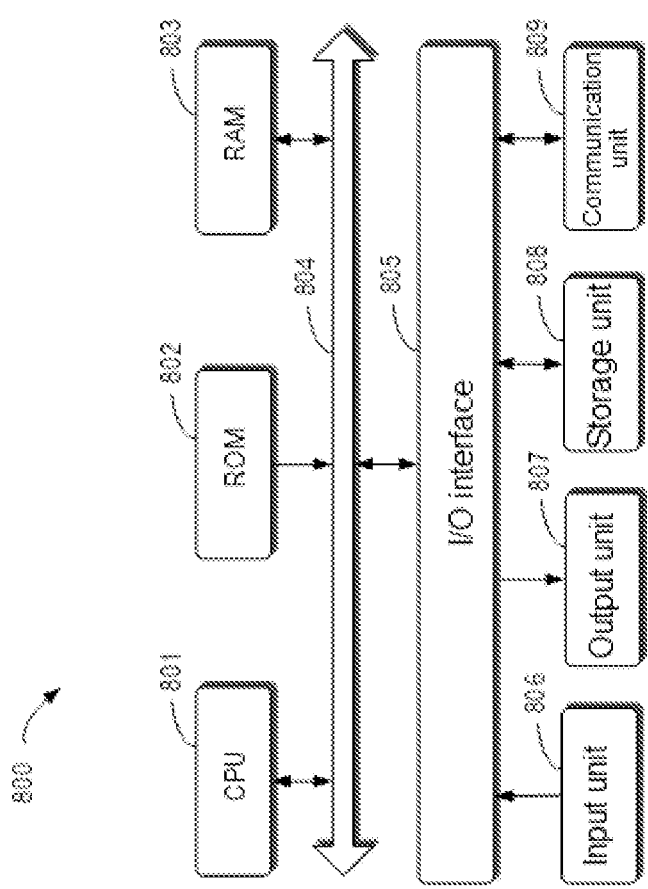
FIG. 8 schematically shows a block diagram of a device for managing an application environment according to an exemplary embodiment of the present disclosure.

FIG. 8 schematically shows a block diagram of device 800 for managing a backup device according to an exemplary embodiment of the present disclosure. As shown in FIG. 8, device 800 includes central processing unit (CPU) 801 that can perform various appropriate actions and processes according to computer program instructions stored in read-only memory (ROM) 802 or computer program instructions loaded from storage unit 808 into random access memory (RAM) 803. In RAM 803, various programs and data necessary for the operation of device 800 may also be stored. CPU 801, ROM 802, and RAM 803 are connected to one another through bus 804. Input/output (I/O) interface 805 is also connected to bus 804.

A plurality of components in device 800 are connected to I/O interface 805 and the components include: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices over a computer network such as the Internet and/or various telecommunication networks.

The various processes and processing procedures described above, such as method 300, may be performed by CPU 801. For example, in some embodiments, the method described above may be implemented as a computer software program that is tangibly embodied in a machine-readable medium such as storage unit 808. In some embodiments, part or all of the computer program may be loaded and/or installed on device 800 via ROM 802 and/or communication unit 809. When a computer program is loaded into RAM 803 and executed by CPU 801, one or more steps of the method described above may be performed. Alternatively, in other embodiments, CPU 801 may also be configured in any other suitable manner to implement the above-described process/method.

According to an exemplary embodiment, an electronic device is provided, including: at least one processor; and a memory coupled to the at least one processor, wherein the memory has instructions stored therein, and the instructions, when executed by the at least one processor, cause the device to perform an action for managing an application environment. The action includes: receiving a set of attribute information from a set of sensors in the application environment respectively; obtaining a state of the application environment based on the set of attribute information; determining reference information corresponding to the state of the application environment based on a knowledge base associated with the application environment, wherein the reference information represents candidate information that a user in the application environment needs in the state; and providing the reference information to the user.

According to an exemplary embodiment of the present disclosure, the set of attribute information includes an image of the application environment, providing reference information includes superimposing the reference information on the image, and the action further includes updating the reference information based on a feedback received from the user on the reference information.

According to an exemplary embodiment of the present disclosure, the application environment includes an application object, the set of attribute information includes an image of the application object, and obtaining the state of the application environment includes determining the state of the application object based on the image.

According to an exemplary embodiment of the present disclosure, the application environment includes a data center, the application object includes an electronic device in the data center, and determining the state of the application object based on the image includes: determining the state of the electronic device based on a control panel of the electronic device in the image.

According to an exemplary embodiment of the present disclosure, determining the reference information includes determining at least any one of: the location of the electronic device, navigation to the location of the electronic device, and guidance to operate the electronic device.

According to an exemplary embodiment of the present disclosure, the application environment includes a vehicle environment, the image of the application object includes an image of a dashboard of the vehicle, and the set of attribute information may further include at least any one of the speed, acceleration, steering information, engine speed, airbag information, tire information, and collision information of the vehicle.

According to an exemplary embodiment of the present disclosure, determining reference information may include determining at least any one of: safety guide, rescue information, and surrounding facility information.

According to an exemplary embodiment of the present disclosure, the set of sensors may include at least any one of: an image sensor, a video sensor, an audio sensor, a temperature sensor, a humidity sensor, a pressure sensor, an air quality sensor, a smoke sensor, a speed sensor, an acceleration sensor, a vibration sensor, a light sensor, and a position sensor.

According to an exemplary embodiment of the present disclosure, providing the reference information includes providing the reference information via at least any one of: a mobile display device, a display device, a projection device, a wearable display device, an audio device, and a haptic device.

According to an exemplary embodiment of the present disclosure, receiving a set of attribute information includes receiving a set of attribute information based on a determination that the user enters the application environment.

According to an exemplary embodiment of the present disclosure, a computer program product is provided, wherein the computer program product is tangibly stored on a non-transitory computer readable medium and includes machine-executable instructions for executing the method according to the present disclosure.

According to an exemplary embodiment of the present disclosure, a computer-readable medium is provided. Machine-executable instructions are stored on the computer-readable medium, and when the machine-executable instructions are executed by at least one processor, the at least one processor is caused to implement the method according to the present disclosure. The present disclosure may be a method, a device, a system, and/or a computer program product. The computer program product may include a computer-readable storage medium on which computer-readable program instructions for performing various aspects of the present disclosure are loaded.

The computer readable storage medium may be a tangible device that can hold and store instructions used by an instruction executing device. For example, the computer-readable storage medium may be, but is not limited to, an electric storage device, a magnetic storage device, an optical storage device, an electromagnetic storage device, a semiconductor storage device, or any suitable combination of the foregoing devices. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read only memory (CD-ROM), a digital versatile disc (DVD), a memory stick, a floppy disk, a mechanical encoding device, such as a punch card or raised structure in a groove with instructions stored thereon, and any suitable combination of the foregoing media. The computer readable storage medium as used herein is not to be interpreted as a transient signal itself, such as a radio wave or other freely propagating electromagnetic waves, an electromagnetic wave propagating through a waveguide or other transmission media (e.g., a light pulse propagating through a fiber optic cable), or an electrical signal transmitted through an electric wire.

The computer readable program instructions described herein may be downloaded from a computer readable storage medium to various computing/processing devices or downloaded to an external computer or external storage device through a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages. The programming languages include object-oriented programming languages (such as Smalltalk and C++) and conventional procedural programming languages (such as "C" Language or similar programming languages). The computer-readable program instructions may be executed entirely on a user computer, or partly on a user computer, or as a stand-alone software package, or partly on a user computer and partly on a remote computer, or entirely on a remote computer or server. In the case of a remote computer being involved, the remote computer may be connected to a user computer through any kind of network, including a local area network (LAN) or a wide area network (WAN), or may be connected to an external computer (for example, via the Internet provided by an Internet service provider). In some embodiments, an electronic circuit, such as a programmable logic circuit, a field programmable gate array (FPGA), or a programmable logic array (PLA), is personalized by utilizing the state information of the computer-readable program instructions. The electronic circuit can execute computer-readable program instructions to implement various aspects of the present disclosure.

Various aspects of the present disclosure are described herein with reference to flowcharts and/or block diagrams of the methods, apparatuses (systems), and computer program products according to embodiments of the present disclosure. It should be understood that each block of the flow charts and/or block diagrams, as well as combinations of blocks in the flow charts and/or block diagrams, may be implemented by computer readable program instructions.

These computer readable program instructions may be provided to a processing unit of a general-purpose computer, a dedicated computer, or other programmable data processing devices to produce a machine, such that these instructions produce, when executed by the processing unit of the computer or other programmable data processing devices, an apparatus implementing functions/actions specified in one or more blocks in the flow charts and/or block diagrams. The computer readable program instructions may also be stored in a computer readable storage medium. These instructions cause a computer, a programmable data processing device, and/or other devices to operate in a particular manner; therefore, the computer readable medium storing the instructions includes an article of manufacture that includes instructions for implementing functions/actions specified in one or more blocks in the flow charts and/or block diagrams.

The computer readable program instructions may also be loaded onto a computer, other programmable data processing apparatuses, or other devices, such that a series of operational steps are performed on the computer, other programmable data processing apparatuses, or other devices to produce a computer-implemented process, and thus the instructions implemented on the computer, other programmable data processing apparatuses, or other devices can implement functions/actions specified in one or more blocks in the flow charts and/or block diagrams.

The flowcharts and block diagrams in the figures illustrate the architecture, functionality, and operation of possible implementations of systems, methods, and computer program products according to various embodiments of the present disclosure. In this regard, each block in the flowcharts or block diagrams may represent a module, a program segment, or a part of an instruction, which includes one or more executable instructions for implementing a specified logical function. In some alternative embodiments, the functions marked in the blocks may also occur in a different sequence than those marked in the drawings. For example, two consecutive blocks may actually be executed substantially in parallel, and they may sometimes be executed in the reverse sequence, depending on the functions involved. It should also be noted that each block in the block diagrams and/or flow charts, as well as combinations of blocks in the block diagrams and/or flow charts, may be implemented with a dedicated hardware-based system that performs a specified function or action, or may be implemented with a combination of dedicated hardware and computer instructions.

The embodiments of the present disclosure have been described above. The above description is exemplary, not exhaustive, and is not limited to the disclosed embodiments. Numerous modifications and variations will be apparent to those skilled in the art without departing from the scope and spirit of the embodiments described. The terms used herein are chosen to best explain the principles and practical applications of the embodiments or improvements to technologies in the market, or to enable other ordinary skilled persons in the art to understand the embodiments disclosed herein.

What is claimed is:

1. A method for managing an application environment, the method comprising:
    receiving a set of attribute information from a set of sensors in the application environment respectively;
    obtaining a state of the application environment based on the set of attribute information;
    determining reference information corresponding to the state of the application environment based on a knowledge base associated with the application environment, wherein the reference information represents candidate information that a user in the application environment needs in the state;
    providing the reference information to the user;
    wherein the set of attribute information comprises one or more images of a set of indicator features of a control panel of the application environment; and
    wherein obtaining the state of the application environment comprises analyzing the one or more images to identify states of respective ones of the set of indicator features of the control panel of the application environment.

2. The method according to claim 1, wherein providing the reference information comprises superimposing the reference information on at least one of the one or more images, and the method further comprises updating the reference information based on a feedback received from the user on the reference information.

3. The method according to claim 1, wherein the application environment comprises a data center, and wherein the application object comprises an electronic device in the data center.

4. The method according to claim 3, wherein determining the reference information comprises determining at least one of: a location of the electronic device; navigation to the location of the electronic device; and guidance to operate the electronic device.

5. The method according to claim 1, wherein the application environment comprises a vehicle environment, wherein the control panel of the application environment comprises a dashboard of the vehicle, and wherein the set of attribute information further comprises at least one of speed, acceleration, steering, engine speed, airbag information, tire information, and collision information of the vehicle.

6. The method according to claim 5, wherein determining the reference information comprises determining at least one of: safety guide; rescue information; and surrounding facility information.

7. The method according to claim 1, wherein the set of sensors comprises at least one of: an image sensor; a video sensor; an audio sensor; a temperature sensor; a humidity sensor; a pressure sensor; an air quality sensor; a smoke sensor; a speed sensor; an acceleration sensor; a vibration sensor; a light sensor; and a position sensor.

8. The method according to claim 1, wherein providing the reference information comprises:
    selecting, based on a type of the application environment, at least one of a set of two or more different types of presentation devices for presentation of the reference information to the user; and
    providing the reference information to the selected at least one of the set of two or more different types of presentation devices;
    wherein the two or more different types of presentation devices comprise two or more of: a mobile display device; a display device; a projection device; a wearable display device; an audio device; and a haptic device.

9. The method according to claim 1, wherein receiving the set of attribute information comprises receiving the set of attribute information based on a determination that the user enters the application environment.

10. The method of claim 1, wherein the set of indicator features of the control panel comprise indicator lights of an electronic device.

11. The method of claim 10, wherein analyzing the one or more images to identify states of respective ones of the set of indicator features of the control panel of the application environment comprises:
    determining whether each of the indicator lights is on or off; and
    representing the set of indicator features as a binary number, wherein each bit of the binary number represents the state of one of the indicator lights.

12. An electronic device, comprising:
    at least one processor; and
    a memory coupled to the at least one processor, wherein the memory has instructions stored therein, the instructions, when executed by the at least one processor, cause the device to perform an action for managing an application environment, and the action comprises:
    receiving a set of attribute information from a set of sensors in the application environment respectively;
    obtaining a state of the application environment based on the set of attribute information;
    determining reference information corresponding to the state of the application environment based on a knowledge base associated with the application environment, wherein the reference information represents candidate information that a user in the application environment needs in the state; and
    providing the reference information to the user;
    wherein the set of attribute information comprises one or more images of a set of indicator features of a control panel of the application environment; and
    wherein obtaining the state of the application environment comprises analyzing the one or more images to identify states of respective ones of the set of indicator features of the control panel of the application environment.

13. The device according to claim 12, wherein providing the reference information comprises superimposing the reference information on at least one of the one or more images, and the action further comprises updating the reference information based on a feedback received from the user on the reference information.

14. The device according to claim 12, wherein the application environment comprises a data center, and wherein the application object comprises an electronic device in the data center.

15. The device according to claim 14, wherein determining the reference information comprises determining at least one of: a location of the electronic device; navigation to the location of the electronic device; and guidance to operate the electronic device.

16. The device according to claim 11, wherein the application environment comprises a vehicle environment, wherein the control panel of the application environment comprises a dashboard of the vehicle, and wherein the set of attribute information further comprises at least one of speed, acceleration, steering information, engine speed, airbag information, tire information, and collision information of the vehicle.

17. The device according to claim 16, wherein determining the reference information comprises determining at least one of: safety guide; rescue information; and surrounding facility information.

18. The device according to claim 12, wherein the set of sensors comprises at least one of: an image sensor; a video sensor; an audio sensor; a temperature sensor; a humidity sensor; a pressure sensor; an air quality sensor; a smoke sensor; a speed sensor; an acceleration sensor; a vibration sensor; a light sensor; and a position sensor.

19. A computer program product, tangibly stored in a non-transitory computer-readable medium and comprising machine-executable instructions that when executed by a processing device cause the processing device to:
    receive a set of attribute information from a set of sensors in the application environment respectively;
    obtain a state of the application environment based on the set of attribute information;
    determine reference information corresponding to the state of the application environment based on a knowledge base associated with the application environment, wherein the reference information represents candidate information that a user in the application environment needs in the state; and
    provide the reference information to the user;
    wherein the set of attribute information comprises one or more images of a set of indicator features of a control panel of the application environment; and
    wherein obtaining the state of the application environment comprises analyzing the one or more images to identify states of respective ones of the set of indicator features of the control panel of the application environment.

20. The computer program product according to claim 19, wherein providing the reference information comprises superimposing the reference information on at least one of the one or more images, and further cause the processing device to update the reference information based on a feedback received from the user on the reference information.

* * * * *